US012612284B2

(12) United States Patent
Friedli

(10) Patent No.: US 12,612,284 B2
(45) Date of Patent: Apr. 28, 2026

(54) CALL INPUT DEVICE WITH DISPLAY AND CALL INPUT DETECTION METHOD FOR CALLING AN ELEVATOR CAR

(71) Applicant: Inventio AG, Hergiswil (CH)

(72) Inventor: Paul Friedli, Remetschwil (CH)

(73) Assignee: INVENTIO AG, Hergiswil (CH)

( * ) Notice: Subject to any disclaimer, the term of this patent is extended or adjusted under 35 U.S.C. 154(b) by 1442 days.

(21) Appl. No.: 17/250,525

(22) PCT Filed: Sep. 18, 2019

(86) PCT No.: PCT/EP2019/075043
§ 371 (c)(1),
(2) Date: Feb. 1, 2021

(87) PCT Pub. No.: WO2020/058348
PCT Pub. Date: Mar. 26, 2020

(65) Prior Publication Data

US 2021/0300723 A1 Sep. 30, 2021

(30) Foreign Application Priority Data

Sep. 18, 2018 (EP) .................................... 18195318

(51) Int. Cl.
*B66B 1/34* (2006.01)
*B66B 1/46* (2006.01)
*B66B 3/00* (2006.01)

(52) U.S. Cl.
CPC ............ *B66B 1/468* (2013.01); *B66B 1/3453* (2013.01); *B66B 1/463* (2013.01); *B66B 3/002* (2013.01); *B66B 2201/102* (2013.01); *B66B 2201/103* (2013.01); *B66B 2201/4615* (2013.01); *B66B 2201/463* (2013.01)

(58) Field of Classification Search
CPC B66B 1/34–3423; B66B 1/3446–3461; B66B 1/46–463; B66B 1/467; B66B 1/468; B66B 3/00; B66B 3/002; B66B 2201/10; B66B 2201/102; B66B 2201/103; B66B 2201/4607; B66B 2201/4615
See application file for complete search history.

(56) References Cited

U.S. PATENT DOCUMENTS 7,404,469 B2 * 7/2008 Takeuchi ................ B66B 1/468 187/391
8,136,636 B2 * 3/2012 Bahjat ..................... B66B 1/468 187/391
(Continued)

FOREIGN PATENT DOCUMENTS

CN 108473270 A 8/2018
DE 10118971 A1 3/2002
(Continued)

*Primary Examiner* — Christopher Uhlir
(74) *Attorney, Agent, or Firm* — Shumaker, Loop & Kendrick, LLP

(57) ABSTRACT

A call input device for an elevator system includes at least one call input facility having at least one directional call button, such as an up-direction call button and/or a down-direction call button. The call input device further includes a storage medium and an output region. During operation, when the directional call button is actuated, instructions for call input by a user stored in the storage medium are output in the output region.

13 Claims, 6 Drawing Sheets

(56) References Cited

U.S. PATENT DOCUMENTS

| | | | | |
|---|---|---|---|---|
| 10,303,744 | B2 * | 5/2019 | Muncy ................ | G06F 3/04845 |
| 10,589,960 | B2 * | 3/2020 | Simcik .................. | B66B 1/3423 |
| 10,994,967 | B2 * | 5/2021 | Fever .................... | B66B 13/303 |
| 2001/0035314 | A1 | 11/2001 | Yoshida et al. | |

FOREIGN PATENT DOCUMENTS

| | | | | | |
|---|---|---|---|---|---|
| GB | 2241090 | A | * | 8/1991 | ............. B66B 1/463 |
| JP | H07247065 | A | | 9/1995 | |
| JP | 2005162344 | A | | 6/2005 | |
| JP | 2006168944 | A | | 6/2006 | |
| JP | 2011063366 | A | | 3/2011 | |
| KR | 20110096269 | A | | 8/2011 | |
| WO | 2011102654 | A2 | | 8/2011 | |

* cited by examiner

CALL INPUT DEVICE WITH DISPLAY AND CALL INPUT DETECTION METHOD FOR CALLING AN ELEVATOR CAR

FIELD

The invention relates to a call input device for an elevator, comprising call input facilities provided on the floors, by means of which an elevator can be requested for the desired direction of travel.

BACKGROUND

A call input device for elevators is known from DE 101 18 971 A1, which has a call input device by means of which a plurality of floors positioned one above the other can be reached. The call input facilities arranged on the floors are provided for the input of calls for the desired direction of travel. Moreover, if there is a large number of users, the destination floor can also be entered in front of the elevator door. Disadvantageously, it appears that people are overwhelmed by the changing call input facilities used for call input. This is especially the case now, as more and more input button pads for a very wide variety of devices are found in buildings, and with a pure destination call input device, either the device is not recognized as such by inexperienced elevator passengers or the user feels at the least unsure of which buttons to use for the elevator trip. This leads to congestion in front of the elevators, especially in building systems with a user base which is highly variable or used to the traditional call input.

The problem addressed by the invention is that of providing a call input device for an elevator and a method for detecting call inputs which overcomes the aforementioned disadvantage.

SUMMARY

This problem is solved by a call input device for an elevator system and a method for detecting a call input according to the following description.

According to the invention, a call input device for an elevator system, by means of which several floors positioned one above the other can be reached, comprises at least one call input facility in the region of the floor doors, i.e. in front of or to the side of the floor doors, that is to say fixedly arranged on the floor and outside the car and in particular fixedly mounted there, which facility is connected to the elevator controller. Each call input facility comprises one or two directional call buttons, in particular an up-direction call button and/or a down-direction call button for selecting the direction of travel desired by the user. The call input device is also equipped with a storage medium and an output region. According to the invention, during operation, when the directional call button is actuated, an elevator call is not triggered, but rather instructions for operating actuatable buttons, which instructions are stored in the storage medium, are output in the output region.

The call input device is the device which contains all the components necessary for calling the elevator. The call input device comprises at least one call input facility by means of which the call can be input. In most elevator systems, the call input device comprises a plurality of call input facilities. For example, a call input facility can be provided on each floor. The call input facilities are fixedly mounted on the floor, i.e. outside the car in the region of the doors, i.e. next to the door on the wall or on a stand, for example. These call input facilities are combined in the call input device. The call input device also comprises components that are required for operating the call input facilities, for example. The call input device comprises a storage medium on which instructions for operating the call input facility are stored. The instructions can be transmitted from this storage medium to the display region of the call input facility.

Call input facilities can be designed as directional call input facilities. A directional call input facility usually consists of an up-direction call button and a down-direction call button. The up-direction call button can, for example, have an upward arrow pointing vertically upwards. The down-direction call button can, for example, have a downward arrow pointing vertically downwards.

The call input facility and/or the call input device is connected to the elevator controller and can thus control the elevators in accordance with the call input.

Instructions for operating the call input facility comprise visual and/or audible instructions for the passenger on how to operate the call input device. The instructions can be step-by-step instructions with, for example, two steps. In a first instruction step, the instructions can show the user how to enter their destination into the call input device via the call input facility. In a second step, the instructions can show the passenger how to get from their input floor to their destination floor via the elevator system. Instructions as described above and below are instructions for operating the call input facility, which inform the user about the step(s) they have to take for the requirements of the elevator, and in particular to select the destination floor. This information is not part of a step for selecting the direction of travel and/or floor, and all floors can therefore be selected independently of the instructions. The instructions are solely content that goes beyond the content for selecting any desired floor of the elevator system. This means that any desired floor can be selected without the instructions. The instructions comprise additional information, namely information that allows a user who is not able to operate the call input device with only the call input facility display to do so. This has the advantage that someone who is unfamiliar with the call input facility, i.e. someone who does not know how to operate the call input facility, is given advice on the requirements of the call input facility by the instructions, but someone who understands the call input facility can select all the destination floors directly without instructions. It has advantageously been shown that a call input device of this kind helps the passenger to make quick and error-free call inputs, and thus allows the elevator system to achieve its maximum transport capacity.

In one embodiment, the directional call button is designed as a pushbutton.

Elevator systems comprising traditional directional call input facilities in the form of pushbuttons are widespread and can easily be recognized as elevator controls even by inexperienced passengers. If a modern destination call input is used in an elevator system, instructions for operating this modified call input facility are therefore issued to the passenger after they have actuated the traditional pushbutton. This ensures that the call input is made correctly and quickly. The passenger is picked up on the basis of their former behavior, which has been ingrained over years. With the instructions, they can practice the unfamiliar call input quickly and safely. This ensures that the transport capacity of the elevator system is not reduced by incorrect journeys and long waiting times for call input.

In a preferred embodiment, the output region is a display region. The display region preferably has a first sub-region and a second sub-region. The instructions for call input, which are stored in the storage medium, are displayed in the display region after the directional call button has been actuated. The instructions are preferably shown in the first sub-region of the display region.

The display region can be a display that allows text and symbols to be displayed. The display region thus allows the instructions to be output in the form of visual instructions, for example in the form of a plurality of images or in the form of an animated image or in the form of a video. The advantage of the visual output over a verbal output is that there is no noise pollution from other people in the vicinity of the call input facility. Dividing the display into a first sub-region and a second sub-region allows different content to be displayed at the same time.

In a preferred embodiment, the first sub-region and/or the second sub-region is designed as a touch-sensitive input display region.

If at least one of the sub-regions of the display region is designed as a touch-sensitive input display region, for example as a touchscreen, the division into two allows the instructions to be displayed in the first sub-region and the call input facility to be implemented in the second sub-region. This allows a call input facility that is particularly easy to understand. The instructions can include advice on the call input facility, for example in the form of arrows. Since the passenger sees the instructions and the call input facility on the two sub-regions one next to the other or one below the other, for example, the input of the call can be made particularly simple by this device. This allows the system to be operated efficiently.

In a preferred embodiment, the first sub-region is designed as a touch-sensitive input display region. The directional button can thus be implemented on the first sub-region. During operation, this directional call button is displayed in the first sub-region until the directional call button is actuated. After the directional call button is actuated, the instructions are displayed in this location.

The call facility is implemented on the second sub-region, for example, which is also designed as a touch-sensitive input display region. In this implementation, the directional call button thus has the function of an assistance button. If this button is actuated, the button disappears and is replaced by the instructions. This allows the assistance to be implemented in the first sub-region in a space-efficient manner.

In a preferred embodiment, the elevator system serves several floors. A call input facility as described above and below is available on each floor. The call input facility further comprises a destination call input facility by means of which calls for destination floors can be input. Upon input, a call identifying the input floor and identifying the destination floor is stored. The destination call input can preferably be implemented on the display region and particularly preferably in the second sub-region.

A destination call input facility allows selection of the destination, i.e. selection of the destination floor, before the elevator is entered, with one of the elevators of the elevator system then being assigned on the basis of the chosen destination. Destination call input devices of this kind are known per se.

In one embodiment, the call input device is designed as a destination call control facility for an elevator system having a plurality of floors. A destination call input facility by means of which calls for destination floors can be input is provided on each of the floors. Upon input, a call identifying the input floor and identifying the destination floor is stored. The call input facility comprises at least one first touch-sensitive input display region for displaying and selecting destination floors. The destination call input facility further comprises at least one directional call button.

It has advantageously been shown that the presence of directional call buttons in a destination call controller makes it possible to use the directional call buttons to provide a dummy version of a familiar type of call input to passengers who are used to this type of call. After actuating the directional call button, the passenger can be given instructions on how to operate the destination call controller so that the passenger is given an explanation of the type of call input that is new to them. If these two input facilities are separate from one another, for example in two sub-regions of an input display region, experienced passengers can use the destination call input facility directly, while inexperienced passengers are introduced to the destination call input facility with the aid of instructions by using the directional call button. In this way, unnecessary hindrance of passengers who are experienced in calling a destination by constant display of the instructions can be prevented.

In a preferred embodiment, the directional call button is designed as a separate up-direction call button and as a separate down-direction call button. During operation, after actuation of the up-direction call button, only destination floors which are above the input floor are displayed on the destination call input facility. After actuation of the down-direction call button, only destination floors which are below the input floor are displayed.

This makes it possible for only the destination floors relevant for the desired direction of travel to be displayed to the unexperienced passenger. The destination call controller is thus further simplified and the risk of the elevator system capacity being reduced by inexperienced users is further reduced.

There may be destination floors which are always displayed regardless of the selected directional call button. For example, in a hotel, the floor on which the reception is located can always be displayed.

In a preferred embodiment, the instructions for selecting the destination floor contain an indication that destination floors are shown in the display region and one of these destination floors must be selected. The instructions preferably also contain an indication that after the destination floor has been selected, an elevator is assigned for the journey from the input floor to the destination floor.

These two indications can, for example, be output simultaneously in the form of two images displayed one below the other.

In a preferred embodiment, the output region is designed as a loudspeaker, at least in part, and the instructions for call input stored in the storage medium are also output as voice output.

This allows a large number of passengers to be reached by outputting the instructions for using the call input facility once, and is therefore particularly advantageous in heavily frequented buildings.

In one embodiment, the instructions are output in a tactile alphabet in the output region. In this embodiment, the call input facility is also marked with a tactile alphabet.

The problem is also solved by a method for detecting a call input in a call input device of an elevator system, in particular a call input device as described above and below. The method comprises the steps of detecting actuation of a directional call button, after the directional call button has been actuated, outputting instructions stored in a storage medium for inputting a destination call.

The output allows passengers to be supported during call input. In particular, the method allows the passenger to learn a new type of call input.

In a preferred embodiment, the display region of the call input facility is designed as a touch-sensitive input display region. The method further comprises the steps of displaying destination floors in the touch-sensitive input display region, and detecting a destination floor input in the touch-sensitive input display region.

In a preferred embodiment, the method comprises interrogation of a separate up-direction call button and a separate down-direction call button. After the up-direction call button has been actuated, the method only displays destination floors which are above the input floor in the step of displaying destination floors. After the down-direction call button has been actuated, the method only displays destination floors which are below the input floor in the step of displaying destination floors.

This allows further simplification of the method for detecting a call input.

In a preferred embodiment, the step of outputting the instructions for call input stored in the storage medium takes place through visual display of the instructions in a first sub-region of the touch-sensitive display input device. The method displays the destination floors in a second sub-region.

The procedure allows the simultaneous display of the instructions and the destination floors for call input, thus making it easier for the passenger to input calls.

In a preferred embodiment, the step of outputting the instructions takes place at least in part by outputting a voice output via a loudspeaker.

It has proven to be advantageous when the instructions can be made accessible to a large number of passengers at the same time.

The problem is also solved by the use of a directional call button in a destination call input facility of a destination call control facility of an elevator system for displaying instructions on the use of the destination call input facility.

DESCRIPTION OF THE DRAWINGS

The invention is explained in more detail below with reference to embodiments in the figures, which show.

DETAILED DESCRIPTION

Figure 1:
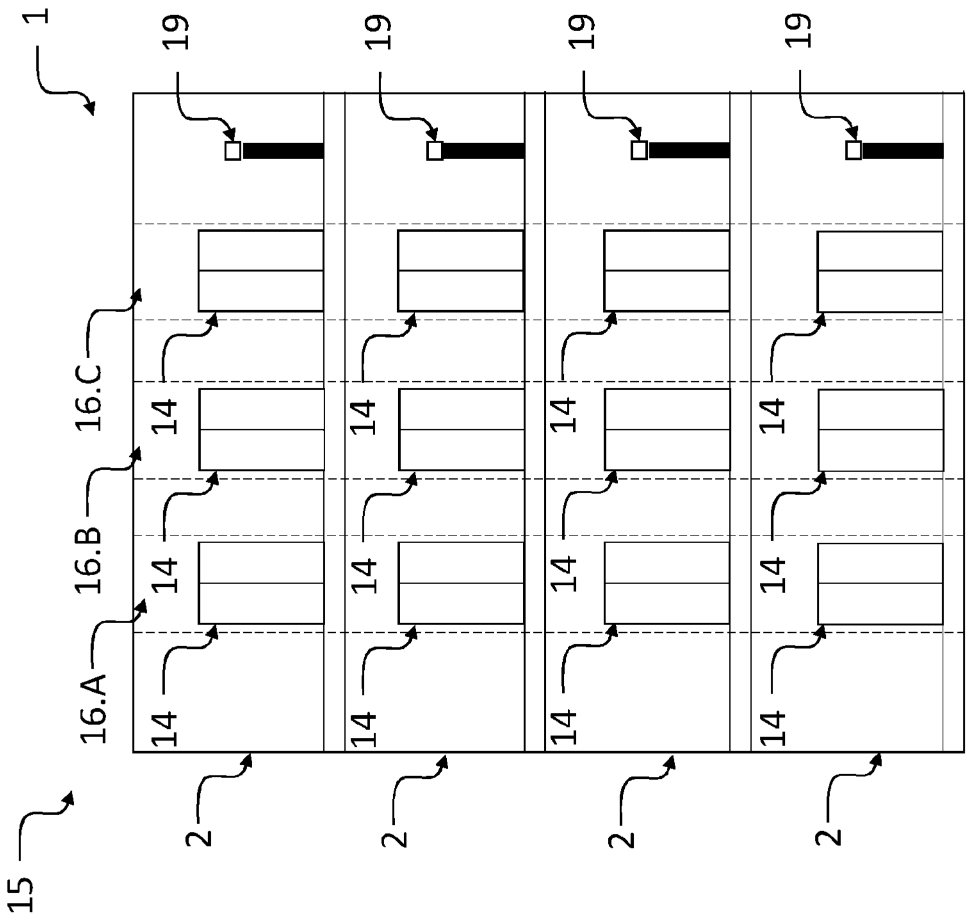
FIG. 1: an elevator system running over several floors having a call input device, comprising one call input facility per floor, by way of example.

FIG. 1 shows an embodiment of an elevator system 15 which runs over four floors 2 and has three elevators 16.A, 16.B, 16.C. The elevator system 15 comprises a call input device 1. On each floor 2 there is an elevator door 14 for each of the three elevators 16.A, 16.B, 16.C, and a call input facility 19 as part of the call input device 1. The call input facilities 19 are fixedly arranged in the region of the doors 14, i.e. to the right of the doors 14 in this embodiment, i.e. outside the car.

Figure 2:
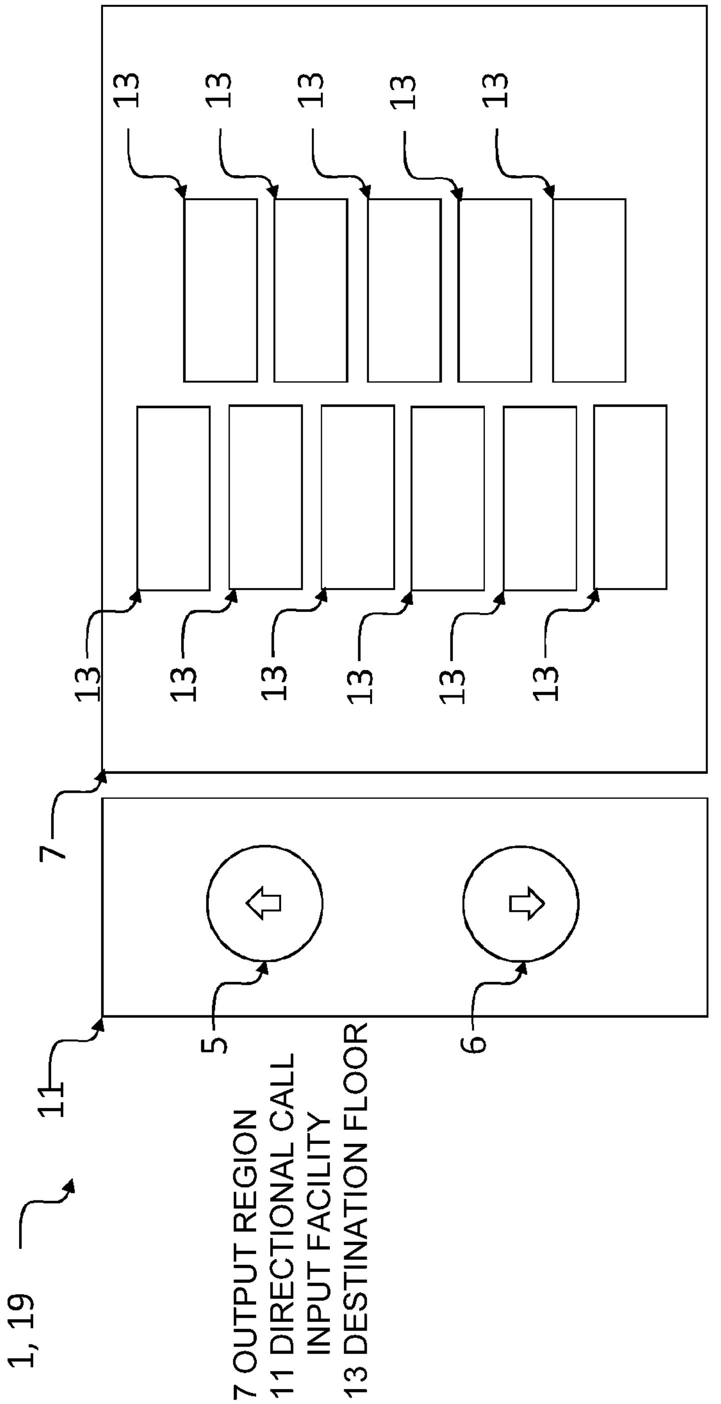
FIG. 2: a first embodiment of a call input facility of a call input device according to the invention.

FIG. 2 shows a first embodiment of a call input device 1 according to the invention. In this first embodiment, the call input device 1 consists of a directional call input facility 11 which comprises an up-direction call button 5 and a down-direction call button 6 and an output region designed as a display region 7. The up-direction call button 5 and the down-direction call button 6 are designed as pushbuttons. The display region 7 is designed as a display. Information on the various destination floors is shown on the display 7 during operation. After the up-direction call button 5 and the down-direction call button 6 have been actuated, instructions for selecting the call input are displayed during operation. In this embodiment, the instructions (not shown) comprise information on which of the destination floors 13 are below the input floor, i.e. below the floor on which the call input facility and the passenger are located, when the down-direction call button is actuated and, when the up-direction call button is actuated, comprise information on which of the destination floors 13 are above the input floor.

Figure 3:
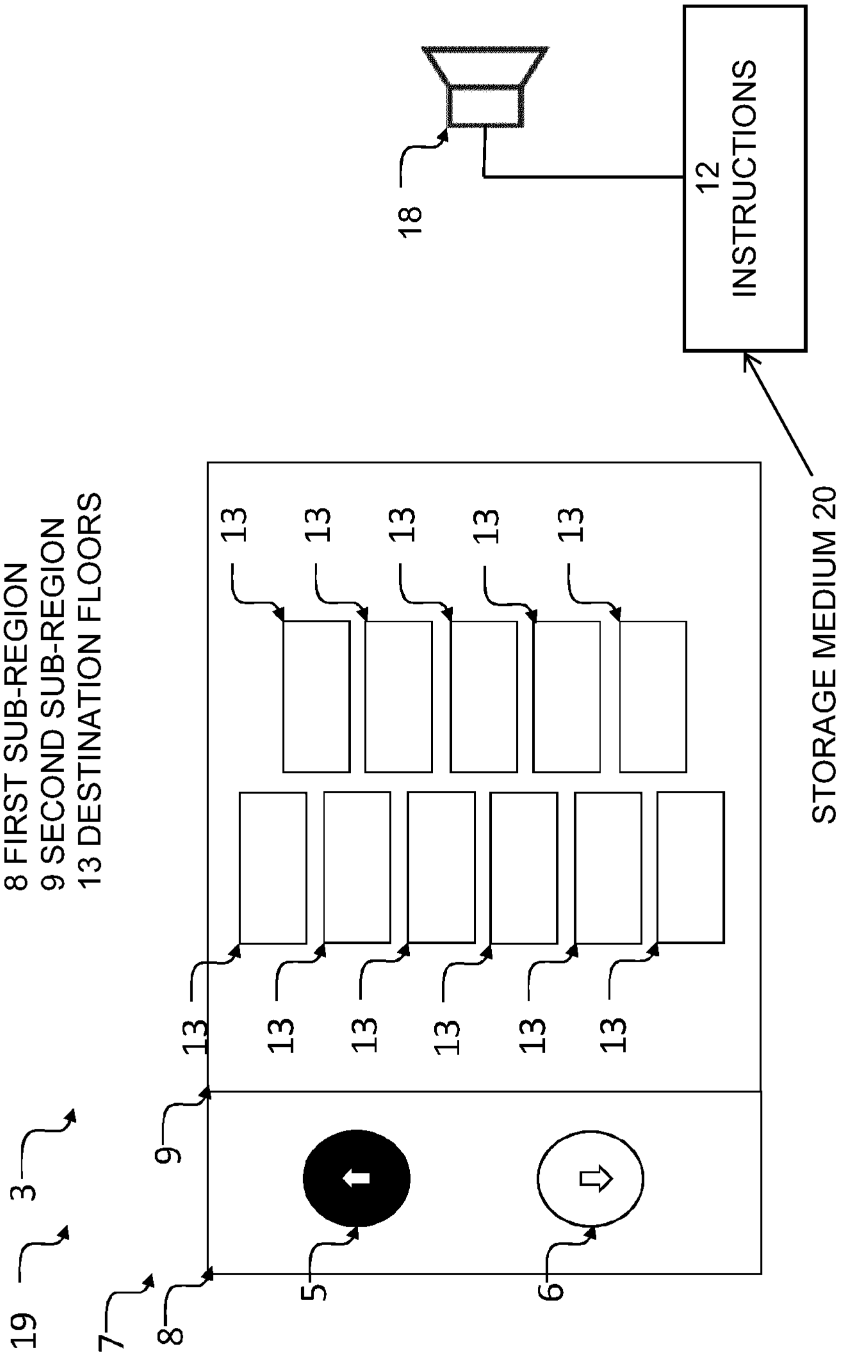
FIG. 3: a second embodiment of a call input facility.

FIG. 3 shows a second embodiment of the call input device 1 according to the invention wherein the call input facility 19 is designed as a destination call input facility 3. In this embodiment, the display region 7 is designed as a touch-sensitive input display region 7 in the form of a touchscreen having a first sub-region 8 and a second sub-region 9. In the first sub-region 8, the directional call input facility 11 is implemented in the form of an up-direction call button 5 and a down-direction call button 6. This implementation is a kind of dummy, the actuation of which does not result in the elevator being called. The destination floors 13 are displayed in the second sub-region 9. One of the destination floors 13 can be selected by touching the corresponding portion of the touchscreen, whereupon the elevator is called. In this embodiment, the elevator is called using a destination call. If the up-direction call button 5 or the down-direction call button 6 is pressed, instructions 12 for selecting the destination floor 13 are output in the form of a voice output via the output region 7, which in this embodiment is designed as a loudspeaker 18. The instructions 12 are stored in a storage medium 20. In these instructions, the passenger is made aware that they should select their destination floor 13 outside the elevator with the aid of the destination floors 13 displayed in the second sub-region, and that one of the plurality of elevators will then be assigned to them for their journey.

Figure 4B:
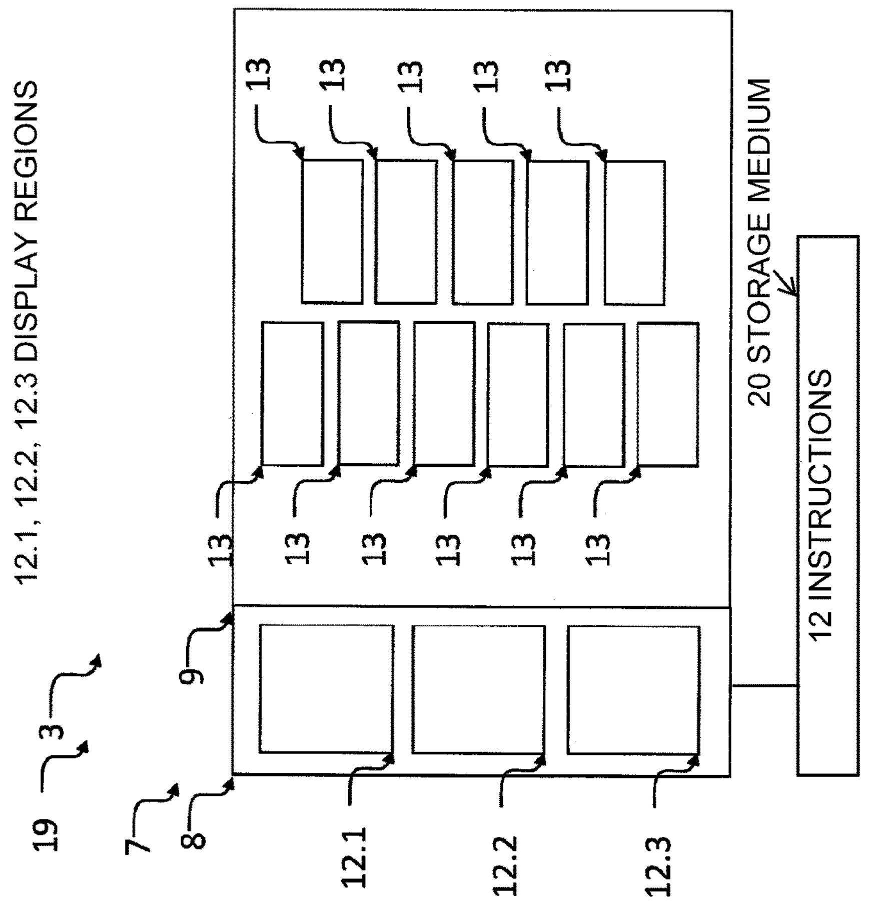
FIG. 4*b*: a second state of the third embodiment of the call input facility.
Figure 4A:
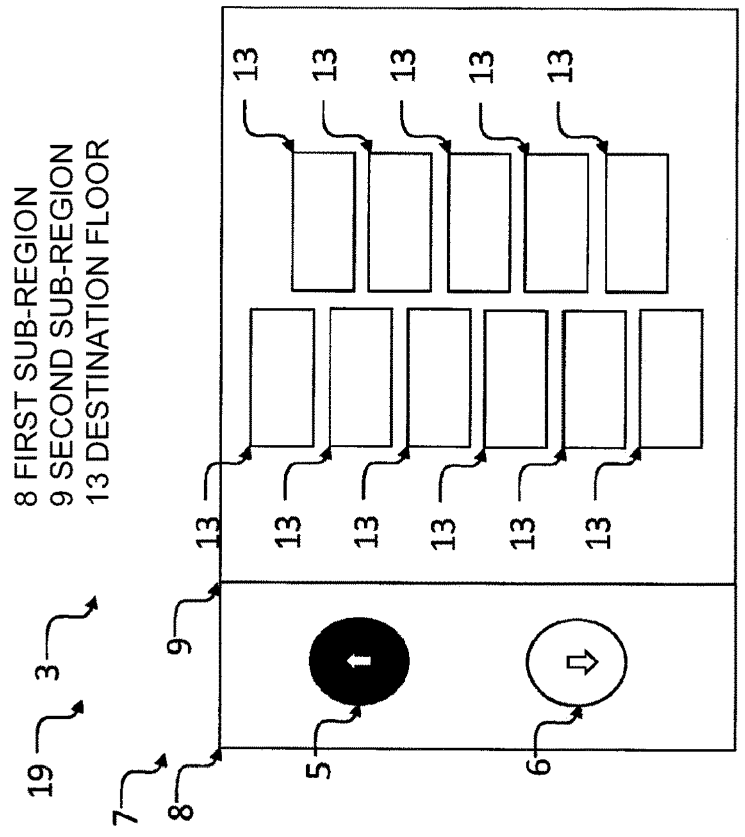
FIG. 4*a*: a first state of a third embodiment of a call input facility.

FIG. 4*a* shows a third embodiment of the call input device 1 according to the invention. In this embodiment, the call input facility 19 is again designed as a destination call input facility 3 in the form of a touchscreen. In a first operating state, the first sub-region 8 and the second sub-region 9 are identical to the embodiment described above. The up-direction button 5 and the down-direction button 6 are displayed on the first sub-region 8 of the touchscreen. The destination floors 13 for destination selection are displayed on the second sub-region 9 of the touchscreen. If the up-direction button 5 or the down-direction button 6 is pressed in the first sub-region, visual instructions 12 for operating the destination call input facility 3 appear in the first sub-region in a second operating state (see FIG. 4*b*). In this embodiment, the instructions 12, stored in the storage medium 20, contain three instruction images 12.1, 12.2, 12.3. The display image 12.1 shows the second sub-region on a reduced scale and a hand choosing one of the destination floors (not shown). The second display image 12.2 shows, on a reduced scale, how an elevator is assigned for the desired journey after the destination floor has been selected using a letter (using the letters A, B, C for the elevator system shown in FIG. 1), which is displayed on the second sub-region. The third display image 12.3 shows the passenger that they should use the corresponding elevator after the assignment.

Figure 5A:
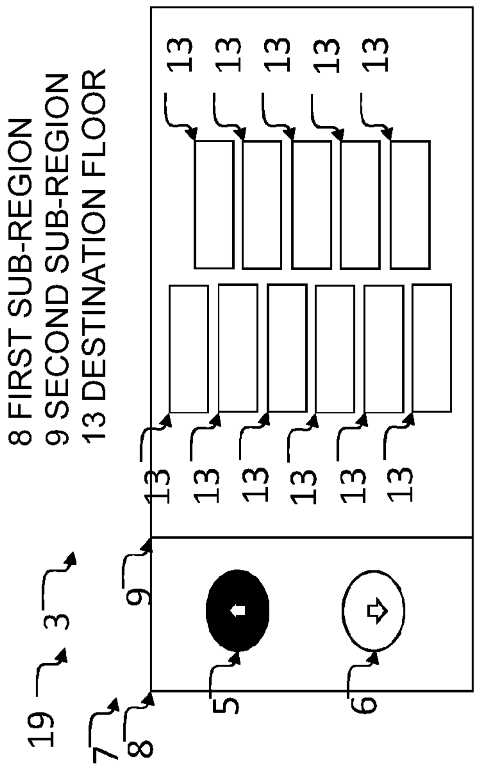
FIG. 5*a*: a fourth embodiment of a call input facility in a first state.
Figure 5B:
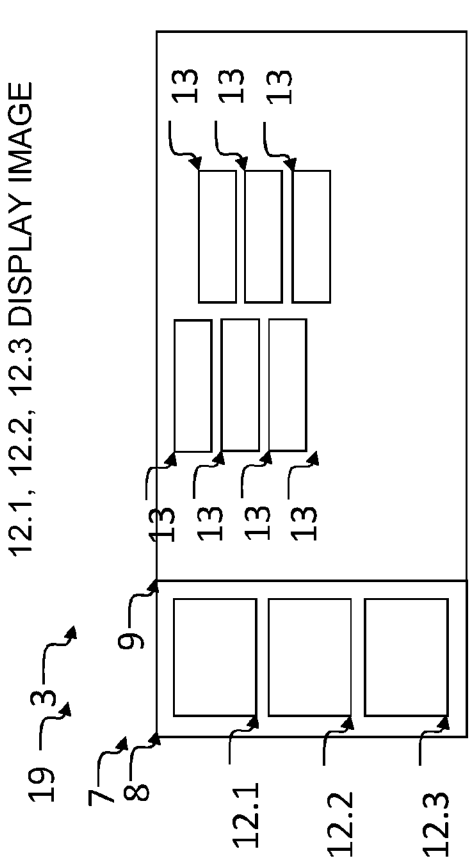
FIG. 5*b*: the fourth embodiment of the call input facility in a second state.
Figure 5C:
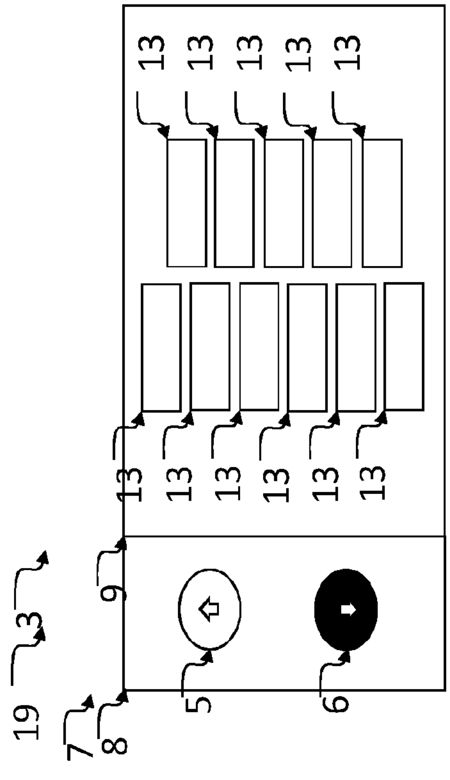
FIG. 5*c*: the fourth embodiment of the call input facility in a third state.
Figure 5D:
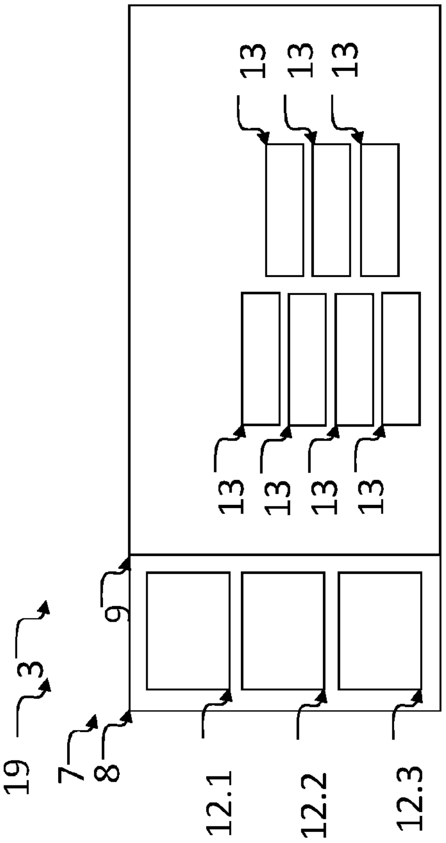
FIG. 5*d*: the fourth embodiment of the call input facility in a fourth state.

FIGS. 5*a* to 5*d* each show a fourth embodiment of a call input facility 19 of a call input device 1 according to the invention. The structure of the call input facility 19 is very similar to that of the third embodiment described above. The elements already present in FIGS. 4*a* and 4*b* are denoted by the same reference signs in FIGS. 5*a* to 5*d*. The description of the elements will not be repeated, and reference is made instead to the preceding description in the paragraph above. In FIG. 5*a*, the up-direction button 5 with a black background indicates that the passenger has actuated this button 5. FIG. 5*b* shows how instructions 12.1, 12.2, 12.3 for using the destination call input facility 3 are then output in the first sub-region 8, similarly to the procedure described for FIGS. 4*a* and 4*b*, instead of the directional call buttons 5, 6. In contrast to the example described for FIGS. 4*a* and 4*b*, after the up-direction call button 5 has been actuated, an adapted selection of destination floors 13 is displayed in the second sub-region 9 (FIG. 5*b*). Only floors above the input floor are displayed in the second sub-region 9 (FIG. 5*b*). Similarly, when the down-direction call button 6 (FIG. 5*c*) is actuated, only destination floors which are below the input floor are displayed in the second sub-region 9 of the touchscreen (FIG. 5*d*).

Figure 6:
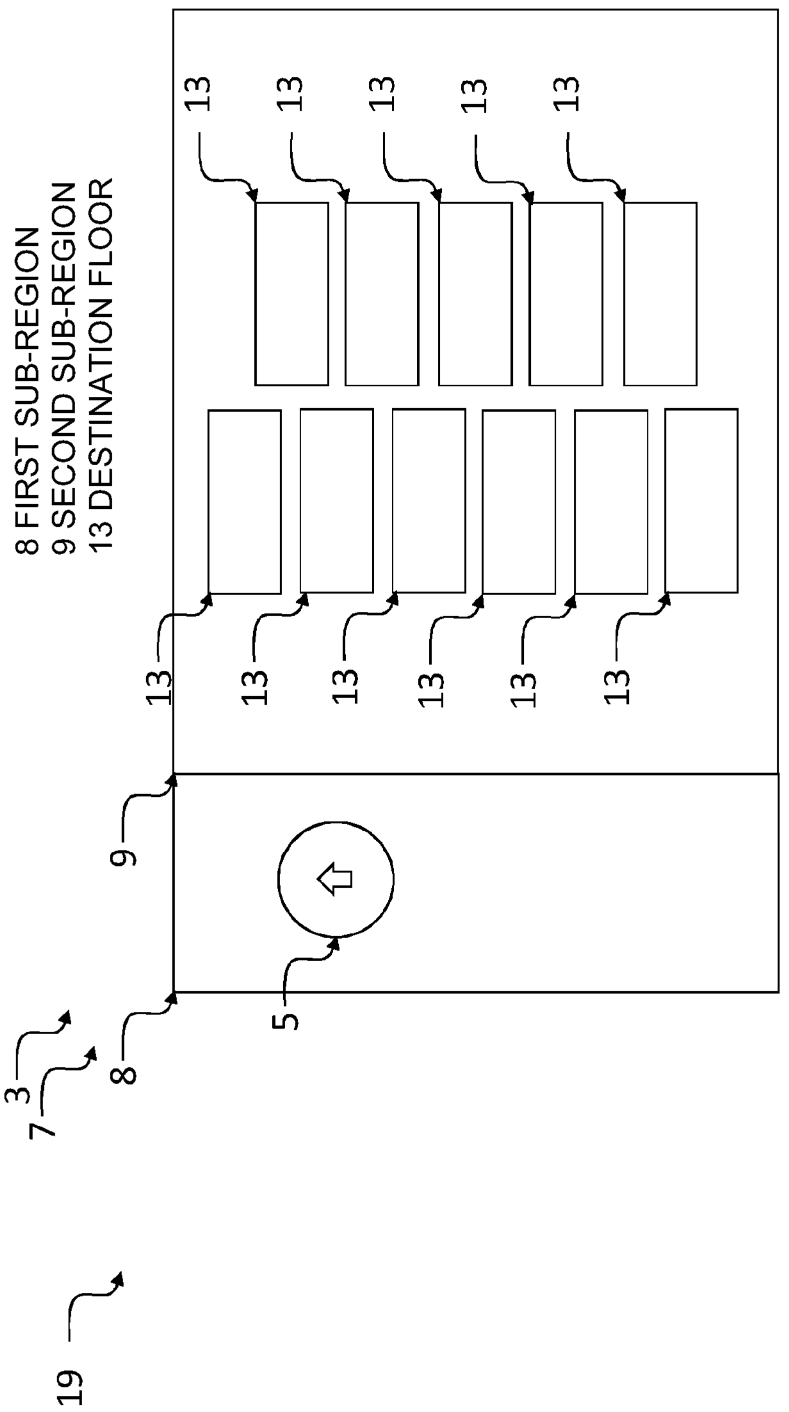
FIG. 6: a fifth embodiment of a call input facility.

FIG. 6 shows a fifth embodiment of a call input facility 19 according to the invention. The structure of the call input facility 19 is very similar to the embodiments described above. The elements already present in FIGS. 2 to 5*d* are denoted by the same reference signs in FIG. 6. The description of the elements will not be repeated, and reference is made instead to the preceding description. The call input facility 19 is located on the lowest floor. There is only one direction of travel from this lowest floor, namely up. Therefore, only an up-direction call button 5 is implemented in the first sub-region 8. When this button 5 is actuated, instructions 12.1, 12.2 and 12.3 are output in the first sub-region (similar to the third embodiment) (not shown, see FIG. 4*b*).

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A call input device for calling an elevator car of an elevator system to reach a plurality of floors positioned one above the other, the call input device comprising:

a call input facility mounted in a region of floor door at an associated floor of the elevator system, the call input facility adapted to generate an elevator call to call an elevator car to the associated floor through a connection to an elevator controller of the elevator system;

the call input facility including at least one directional call button being either an up-direction call button or a down-direction call button for selecting a direction of travel desired by a user;

the call input device including a storage medium and an output region being a display region, wherein actuation of the at least one directional call button by the user does not trigger the elevator call and outputs instructions for operating actuatable destination call buttons in the output region that enable the elevator car to be assigned, the instructions being stored in the storage medium; and wherein the display region has a first sub-region and a second sub-region, the at least one directional call button being displayed in the first sub-region and the destination call buttons being simultaneously displayed in the second sub-region, and the instructions, when outputted, being displayed in the first sub-region in place of the at least one directional call button while the destination call buttons are simultaneously displayed in the second sub-region.

2. The call input device according to claim 1 wherein at least one of the first sub-region and the second sub-region is a touch-sensitive input display region.

3. The call input device according to claim 1 wherein the first sub-region is a touch-sensitive input display region that displays the at least one directional call button and, in response to the at least one directional call button being actuated, the instructions are displayed in the second first sub-region.

4. The call input device according to claim 1 including one of the call input facility mounted at each of the floors of the elevator system, each of the call input facilities including a destination call input facility for entering destination calls for destination floors among the floors of the elevator system, each of the destination call input facilities responding to entry of a destination call by storing a call identifying a one of the floors at which destination call was entered and a call identifying a destination floor associated with the destination call, wherein entry of the destination call by a user is made in the output region.

5. The call input device according to claim 4 wherein the at least one directional call button includes one of the up-direction call button and one of the down-direction call button, wherein actuation of the up-direction call button generates a display in the output region of only destination floors that are above a one of the floors at which the up-direction call button is actuated and actuation of the down-direction call button generates a display in the output region of only destination floors that are below a one of the floors at which the down-direction call button is actuated.

6. The call input device according to claim 4 wherein the instructions contain an indication that destination floors are shown in the output region and that one of the destination floors must be selected by the user, and an indication that the elevator car of the elevator system is assigned for a journey from a one of the floors at which the call input facility is mounted to the destination floor selected by the user.

7. The call input device according to claim 1 wherein the output region includes a loudspeaker and the instructions stored in the storage medium are output as a voice output from the loudspeaker.

8. A method for detecting a call input in a call input device of an elevator system, the method comprising the steps of:

detecting actuation of a directional call button;

in response to the actuation of the directional call button, outputting instructions for inputting a destination call in the elevator system, the instructions being stored in a storage medium; and wherein the call input device has a display region including a first sub-region and a second sub-region, displaying the directional call button in the first sub-region and destination call buttons simultaneously in the second sub-region, and displaying the instructions, when outputted, in the first sub-region in place of the directional call button while the destination call buttons are simultaneously displayed in the second sub-region.

9. The method according to claim 8 including providing the call input device with a call input facility mounted in a region of floor door at an associated floor of the elevator system, the call input facility including the directional call button, the storage medium and the display region, wherein actuation of the directional call button by a user does not trigger the destination call and outputs the instructions in the display region.

10. The method according to claim 9 wherein the output display region includes a touch-sensitive input display region and including steps of displaying destination floors in the touch-sensitive input display input display region and detecting an input of one of the destination floors in the touch-sensitive input display region.

11. The method according to claim 10 including interrogation of a separate up-direction call button and a separate down-direction call button to detect an actuation, wherein after the up-direction call button has been actuated, displaying only ones of the destination floors that are above a one of the floors at which the call input facility is mounted, and wherein after the down-direction call button has been actuated, displaying only ones of the destination floors that are below the floor at which the call input facility is mounted.

12. The method according to claim 10 including outputting the instructions for inputting a destination call as a visual display of the instructions in the first sub-region of the touch-sensitive display input region and displaying the destination floors in the second sub-region of the touch-sensitive display input region.

13. The method according to claim 8 including outputting the instructions as a voice output from a loudspeaker.

* * * * *